(12) United States Patent
Ong et al.

(10) Patent No.: US 9,942,093 B2
(45) Date of Patent: Apr. 10, 2018

(54) DATA GATHERING FOR A NODE

(75) Inventors: Ivan Ong, Malvern, PA (US); David Urban, Downingtown, PA (US); Clifton Lowery, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 136 days.

(21) Appl. No.: 13/219,236

(22) Filed: Aug. 26, 2011

(65) Prior Publication Data
US 2013/0051314 A1 Feb. 28, 2013

(51) Int. Cl.
*H04L 12/28* (2006.01)
*H04L 12/24* (2006.01)
*H04W 88/06* (2009.01)

(52) U.S. Cl.
CPC ...... *H04L 41/0816* (2013.01); *H04L 41/0672* (2013.01); *H04W 88/06* (2013.01)

(58) Field of Classification Search
USPC .......... 370/329, 331, 333, 338; 709/222–229
See application file for complete search history.

(56) References Cited

U.S. PATENT DOCUMENTS

| | | | |
|---|---|---|---|
| 7,363,031 B1* | 4/2008 | Aisa | 455/419 |
| 2005/0233733 A1* | 10/2005 | Roundtree et al. | 455/414.1 |
| 2009/0131038 A1* | 5/2009 | MacNaughtan et al. | 455/422.1 |
| 2010/0090796 A1* | 4/2010 | Perez et al. | 340/5.7 |
| 2010/0182915 A1* | 7/2010 | Montemurro et al. | 370/252 |
| 2010/0291880 A1* | 11/2010 | Feldstein | H04B 1/40 455/73 |
| 2011/0035624 A1* | 2/2011 | Miller | 714/15 |
| 2011/0185263 A1* | 7/2011 | Chapman et al. | 714/776 |
| 2012/0077467 A1* | 3/2012 | Fan et al. | 455/414.1 |
| 2012/0243517 A1* | 9/2012 | Aguirre et al. | 370/338 |
| 2012/0278654 A1* | 11/2012 | Shen et al. | 714/23 |

OTHER PUBLICATIONS

Bluetooth Versions article, copyright 2011 BlueTomorrow.com, 2 pages.

* cited by examiner

*Primary Examiner* — Zewdu A Beyen
(74) *Attorney, Agent, or Firm* — Banner & Witcoff, Ltd.

(57) ABSTRACT

Methods and systems are disclosed including a mobile device configured for initiating a communication session with a transceiver interface of a node that comprises a network interface. The node may be queried via the communication session for a status report associated with an error, and an instruction may be communicated to the node via the communication session instructing the node to perform an operation. Communication may be established with the wireless access point via the wireless network after communication of the instruction. The transceiver interface may be configured to communicate via a second network to address issues in the wide area network.

20 Claims, 4 Drawing Sheets

DATA GATHERING FOR A NODE

BACKGROUND

Communications and data service providers have implemented different types of wired and wireless networks including, for example, cellular data networks and wireless local area networks (WLANs). A WLAN may include a wireless access point (WAP), such as a wireless router, that establishes wireless communication with a user's mobile device. Service providers typically geographically locate WAPs in places where a large number of people pass on a given day, such as near restaurants, amusement parks, shopping malls, parks, etc.

Service providers often embed the WAPs within a housing or other physical structure to prevent tampering. This structure, however, can increase the amount of time required to service the WAPs. Service providers may also mount the WAPs in out of the way locations, such as on telephone poles or on telephone wires.

WAPs, like many other types of computer hardware, occasionally experience problems, such as errors. Such problems often require a service technician to physically access and manipulate by hand the WAP to address the problems.

Servicing the WAP often may be a time consuming process due to the difficulty in accessing and servicing the WAP. For instance, the WAP may be located in a housing attached to a telephone pole and would require a crane to lift the technician up to the housing. In high traffic areas, government regulation may limit the times during which the WAPs can be serviced to avoid disrupting pedestrian or automotive traffic. The technician may have to schedule a maintenance window with a governmental entity or other authority prior to beginning service. Delay in servicing, however, increases the amount of degraded performance or downtime of the WAP, which is undesirable.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

According to some aspects, a mobile device may be configured for initiating a communication session with a transceiver (e.g., short-range transceiver) interface of a node that comprises a network interface, which may be configured to communicate via a wide area network, and a wireless access point configured to establish a wireless network. The mobile device may be configured for querying the node via the communication session for a status report associated with an error preventing the node from communicating via the wide area network or the wireless network. The mobile device may be configured for communicating an instruction to the node, via the communication session, instructing the node to perform an operation, and establishing communication with the wireless access point via the wireless network after communication of the instruction.

According to additional aspects, a node may be configured for establishing, by a transceiver (e.g., a short-range transceiver) interface of the node, a communication session with a mobile device, and generating a status report associated with an error preventing the node from communicating via a wide area network or a wireless network. The node may also be configured for processing an instruction, received via the communication session, instructing the node to perform an operation to remedy the error, and, in response to performing the operation, establishing, by a wireless access point of the node, a second communication session with the mobile device via the wireless network.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which are shown by way of illustration various examples in which the embodiments may be practiced. It is to be understood that other embodiments may be utilized and structural and functional modifications may be made without departing from the scope of the present disclosure.

Figure 1:
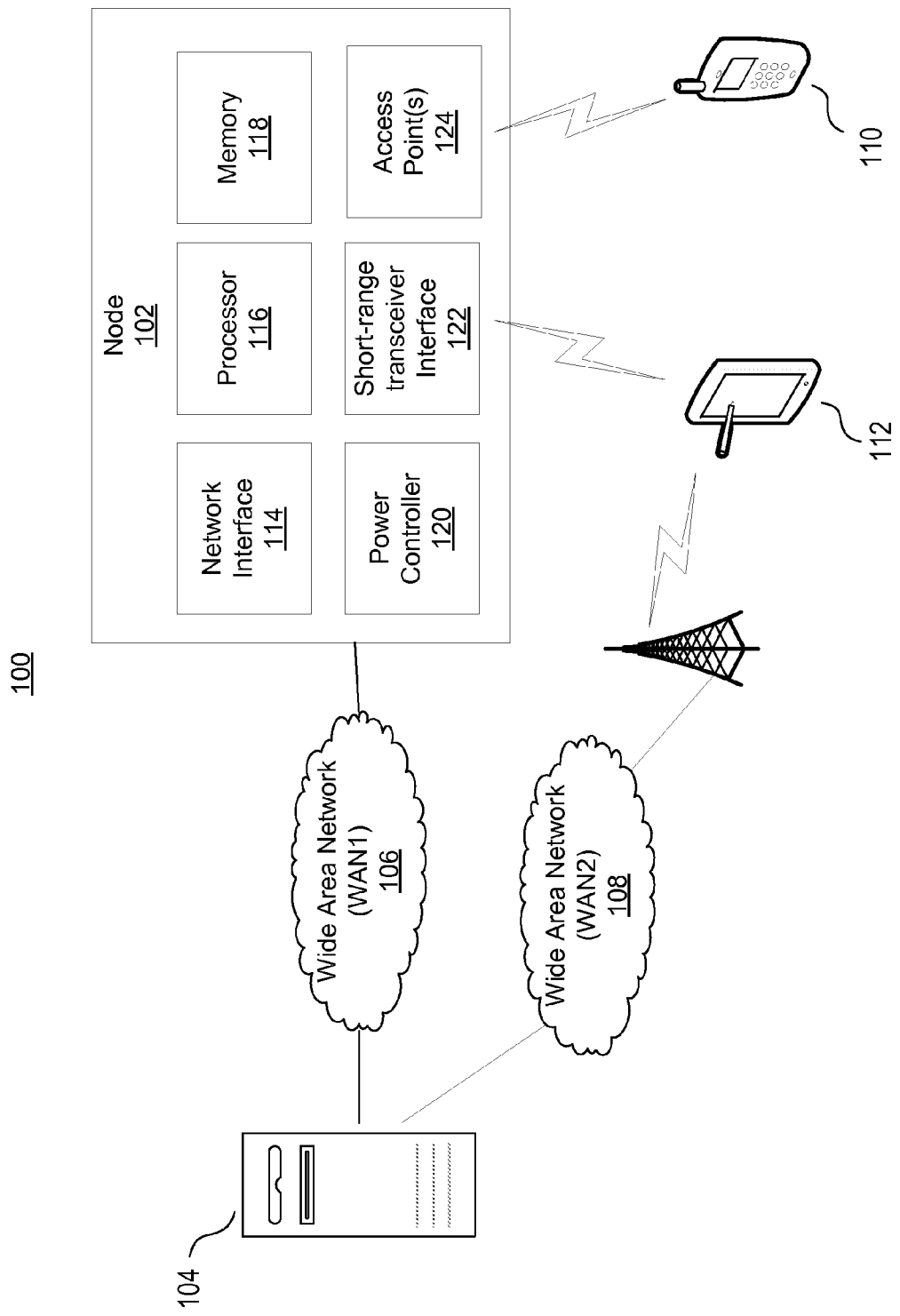
FIG. 1 is a functional block diagram of an example system for communicating with a node.

FIG. 1 is a functional block diagram of an example system for communicating with a node, such as a mounted node. The system 100 may provide for an improved ability to communicate with a mounted node 102 that is experiencing an error or some type of malfunction. The node may be, for example, a strand mounted node such as the Belair Networks™ BA100S strand mounted node or other type of device configured to establish a wireless network for communicating data with nearby devices or networks. The node 102 may be advantageously located by the network operator to better provide service. For example, the node 102 may be physically mounted on a telephone pole or placed in another location that is somewhat inaccessible due to traffic (e.g., pedestrian or automobile traffic, etc.) and/or due to being physically encased within a housing. The node 102 may even be located in a restricted access area, including, for example, a customer's home. It is noted that although FIG. 1 depicts only single components, multiple components as well as other components may be used.

A network operations center (NOC) server 104 may interact with some or all of the nodes 102 to determine, for example, whether each is operating normally. In an example, server 104 may be located at an operator's control location or a head end. Periodically, the server 104 may communicate a status request to the node 102 via a wide area network (WAN1) 106 (or a local network) to confirm that each node 102 is operating normally. A channel established for communication between the server 104 and the node 102 via WAN1 106 may be referred to as in-band communication channel. When functioning properly, the node 102 may respond to the status request with a status report. The status report may include information on the node 102 such as, for example, (1) system-uptime (e.g., duration of node's uptime, measured in, for example, in days, minutes), (2) health state of WiFi radios within the node 102, (3) specific configuration parameters such as, for example, administrative state, transmit (tx) level, channel assignment, transmit (tx) type (e.g., 1×1, 2×3, 3×3 Multiple Input Multiple Output (MIMO)), (4) client association history log which may be used, for example, when a Law Enforcement Agency issues a subpoena for tracking purposes, (5) other types of responses, as well as any combination thereof.

When the node 102 experiences a problem, the server 104 may not be able to communicate with the node 102 via the wide area network 106. If able to communicate, the server 104 may instruct the node 102 to perform a hard reset and to provide a status report thereafter informing the server 104 about whether the hard reset corrected the issue. If the hard reset did not correct the issue or if the server 104 is unable to communicate with the node 102 via the wide area network 106, the server 104 or its operator may cause a service technician to be dispatched to the node 102.

Rather than requiring a service technician to physically access the node 102 (e.g., touch with their hand), the system 100 may provide a different communication channel, e.g., an out of band communication channel, for communication between the server 104 and the node 102. The out of band channel may include establishing a first communication session between the server 104 and a mobile device 112, which may be used by a technician, located nearby the node 102 via a second wide area network (WAN2) 108 (or a local network), and a second communication session between the mobile device 112 and the node 102. The mobile device 112 may be a mobile phone, a smart phone, a laptop computer, a netbook, a tablet computer, or other device configured for wireless communication. Each of the first and second communication sessions may include wireless or other types of communication. The WAN2 108, for example, may include a cellular data network (e.g., 3G cellular, 4G cellular, etc.) or other type of network and the node 102 may include a short-range transceiver (e.g., Bluetooth antenna) that permits wireless communication with a mobile device 112.

Rather than requiring the technician to physically access and manipulate the node 102 by hand, the mobile device 112 may attempt to wirelessly communicate with the node 102 to attempt to resolve the error experienced by the node 102 from a nearby location. For example, the technician may be standing on the ground nearby a telephone pole on which the node 102 is mounted, instead of requiring hands-on access via a crane to physically access the node 102.

To establish communication via the out of band communication channel, the mobile device 112 may move within range of a transceiver interface 122 of the node 102. The transceiver interface 122 may include a transceiver (e.g., a short-range transceiver) to communicate data with one or more mobile devices 112. The transceiver interface 122 may be used for establishing a communication session on the out of band communication channel with a nearby mobile device 112. For example, the transceiver interface 122 may be used to establish a pico-net, a Bluetooth network, or other types of short-range networks. Other short-range networks used to establish communication channels that are simple, robust, low bandwidth may also be used.

The node 102 may include components for communicating via WAN1 106 and WAN2 108. In an example, the node 102 may include a network interface 114 for communication via the WAN1 106, a processor 116, a memory 118, a power controller 120 to control power to the node 102, a transceiver interface 122, which may include a short range transceiver, and one or more wireless access points 124. The memory 118 may be a computer readable medium, such as a hard disk, a flash drive, a read only memory (ROM), a random access memory (RAM), an optical drive, or other physical device configured to tangibly store computer readable instructions. The processor 116 may process the instructions to control the network interface 114, power controller 120, transceiver interface 122, and access point 124 and to cause the node 102 to perform the operations described herein.

The one or more wireless access points (WAPs) 124 may be devices configured to establish one or more wireless networks using a protocol such as, for example, IEEE 802.11, for robust and high data rate transmission. Each wireless access point 124 may include a transceiver to transmit and receive data from consumer mobile device(s) 110 and/or mobile device(s) 112.

When first being deployed, a technician may physically install the node 102 at a desired location. For example, a storeowner may contact an Internet Service Provider requesting Internet service at their open air cafe and a technician may install the node 102 on a nearby telephone pole. The node 102 may be placed on a telephone pole, hung on a telephone wire, installed or encased in a housing or other physical structure, or installed at other desired locations. Once installed, the mobile device 112 may establish a communication session with the node 102 via the transceiver interface 122 to download device and location information from the node 102 for transmission to the server 104 via WAN2 108. The mobile device 112 may also instruct the node 102 to communicate this information to the server 104 via WAN1 106. Device information may include, for example, a network address (e.g., media access control (MAC)) of the node 102 and/or a serial number of the node 102. Location information may include, for example, one or more of a global positioning system (GPS) coordinates of the node 102, a geographic marker identifier, etc. A geographic marker identifier may identify a geographic landmark on which the node 102 is located. The geographic marker identifier may be a telephone pole identifier, for example, indicating that the node 102 is located on a particular telephone pole.

In use, a user of consumer mobile device 110 or other individuals may report a problem (e.g., no access, slow data rates, etc.) with wirelessly accessing the Internet (or another network or database) via the node 102. To report the problem, the user may place a telephone call, may send an email, SMS or MMS message, may access a webpage, or otherwise communicate to report the error. The error may be communicated to the server 104. The server 104 may also detect the error, for example, by communicating a status request to the node 102 and not receiving a status report in response within a predetermined amount of time (e.g., 5 minutes). The status report may also identify an error. The server 104 may attempt to address the error remotely by sending one or more commands to the node 102. If unable to remotely address the problem, the server 104 may communicate a dispatch message to a dispatch center to dispatch a service technician to the geographic location of the node 102. The dispatch message may include the device and location information of the node 102, as well as a passcode of the node 102 described in further detail below.

Rather than having to gain physical access to the node 102, the service technician may move within range of the transceiver of the transceiver interface 122 to determine if the mobile device 112 can communicate with the node 102. For example, the node 102 may be mounted on a telephone pole, and the technician may move to a base of the telephone pole. If the transceiver interface 122 is operational and within range, the mobile device 112 may initiate pairing with the node 102. Pairing may refer to establishing a communication session between the mobile device 112 and the node 102. To pair with the node 102, the transceiver interface 122 may prompt the mobile device 112 to provide a passcode or other authenticating information. The passcode may be used to authenticate the mobile device 112 as a device authorized to access control functions of the node 102. The passcode may be unique to each node 102 or may be a generic to a group of nodes, and may prevent accidental pairing between the transceiver interface 122 and another device (e.g., consumer mobile device 110) that does not have the correct passcode.

Upon verification of the passcode, the transceiver interface 122 may be paired with the mobile device 112 and may establish a communication session via one or more supported protocols (e.g., secure shell (SSH), telnet, hypertext transfer protocol (http), http secure (https), etc.). Pairing may establish a master-slave relationship, wherein the mobile device 112 is the master and controls operations of the slave transceiver interface 122.

After a successful pairing, the mobile device 112 may communicate commands, transmit software, etc., using the communication session instructing the transceiver interface 122 to perform certain functions on the node 102 and/or to extract data from the node 102. For example, the mobile device 112 may communicate a query command to the transceiver interface 122 requesting the device and location information, discussed above, as well as a status report of the node 102. The mobile device 112 may process the device and location information to confirm that the technician is attempting to service the correct node 102.

The status report may specify one or more types of errors experienced by the node 102. Example errors include the network interface 114 being unable to detect a signal from the WAN1 106, a signal to noise (SNR) ratio that is too low on one or more channels, a power drop across the node 102 that is too large or small, an error in a particular subcomponent, being unable to communicate with the WAN1 106 via the network interface 114, being unable to communicate with any mobile device 110/112 via the access point 124, etc. Other errors may include, for example: (1) indicating that a backhaul link is down (e.g., this can translate to a secure tunnel encountering issues), (2) both access point radios are down for whatever reason (e.g., whether administratively disabled and/or caused by software and/or hardware), etc.

The status report may also provide usage statistics on data throughput to various consumer devices, such as mobile devices 110, to determine if a particular device 110 is improperly using more bandwidth than allocated. The mobile device 112 may process the status report and/or may forward the status report to the server 104, via the WAN2, 108 to diagnose an error and/or to determine how to address the error. In an example, the mobile device 112 may address the error by instructing the node 102 to perform a hard reset and/or by communicating a program script to modify software of the node 102 stored in the memory 118.

For a hard reset, the mobile device 112 may communicate a hard reset instruction to the node 102 via the transceiver interface 122. The transceiver interface 122 may monitor whether the node 102 turns itself off and then back on within a predetermined amount of time. If the node 102 does not, the transceiver interface 122 may instruct the power controller 120 to remove power to the node 102 and to resupply the node 102 with power to force the node 102 to turn off and back on.

The transceiver interface 122 may communicate a hard reset confirmation message informing the mobile device 112 whether the hard reset instruction was successfully performed and whether the hard reset address the error. The mobile device 112 may then attempt to wirelessly communicate with the node 102 via the transceiver of the wireless access point 124 to confirm that the issue with the wireless network has been resolved. If the issue persists, then the service technician may have to take further measures to address the error.

Instead of or in addition to instructing the node 102 to perform a hard reset, the mobile device 112 or the server 104 may identify a program script based on processing the status report to modify software of the node 102 stored in the memory 118. The program script may include a software update and/or may include instructions to adjust settings of the node 102.

If the node 102 is a cable modem, for example, these types of devices include a variable attenuator that attenuates radio frequency (RF) signals upon receipt from the WAN1 106 prior to processing by the node 102. If not properly configured, the variable attenuator may over-attenuate the RF signal. The node 102 may improperly determine that it is unable to receive the RF signal from the WAN1 106, which in fact the variable attenuator has attenuated the RF signal to such a low level that the node 102 cannot detect the RF signal. To detect over-attenuation, the status report may include an RF power measurement, a voltage measurement, and/or other types of measurements of the RF signal prior to and after the variable attenuator. The node 102 may be, for example, an optical node, a wireless node, or another type of node.

The mobile device 112 and/or the server 104 may process the status report to determine that, for example, the variable attenuator is improperly attenuating the RF signal and may communicate a program script to reconfigure the settings of the variable attenuator to reduce the amount of attenuation. The mobile device 112 may instruct the node 102 to store and execute the program script, and may communicate a confirmation message informing the mobile device 112 that the node 102 has loaded the program script. The mobile device 112 may then attempt to communicate with the node 102 via the transceiver of the wireless access point 124. If the error has not been addressed by the program script, then the service technician may have to take further measures to address the error.

The status report may also identify heavy bandwidth users or devices of the node 102. For instance, some consumer mobile devices 110 may contract with a service provider to receive a predetermined amount of bandwidth via the node 102. If the usage statistics of the status report indicate that a particular consumer mobile device 110 is using more bandwidth than allocated, the processor 116 may execute the program script to cause the node 102 to reduce data throughput to a particular mobile device 110. If the usage statistics indicate that a particular consumer mobile device 110 is pirating Internet or other network access (e.g., accessing the Internet via the node 102 when not authorized to do so), the processor 116 may execute the program script to cause the node 102 to block the network address (e.g., MAC address) of the pirating consumer mobile device 110.

The system 100 may thus be configured to improve a service provider's (e.g., technician's) ability to service a mounted node, without requiring physical access and manipulation of the node. The technician instead may communicate with a short-range transceiver interface of the node and attempt to wirelessly address any problems the node may be experiencing, rather than requiring the technician to physically access the node.

The example embodiments may also be useful to maintain other types of nodes including, for example, fiber nodes, bridge amplifiers, and line extenders. Generally, a node may be any device that could communicate via a secondary short range network to provide information about the node and a WAN1 106 to exchange information with the server 104 or other device. A fiber node may, for example, convert upstream and downstream signals (e.g., RF signals) for transport over different media (e.g., for transport via optical fiber from coaxial cable and vice versa). A bridge amplifier may, for example, amplify upstream and downstream signals and split the signals to, for example, four branches of coax runs. A line extender may, for example, amplify upstream and downstream signals.

A fiber node, a bridge amplifier, and a line extender may only communicate using transport signals (e.g., layer 0 of the OSI stack), but may not have a protocol or perform demodulation.

These types of nodes often do not, but may, include an access point 124 providing a wireless network, and may be coupled to a first transport medium (e.g., a fiber optic cable) on one side and a second transport medium (e.g., a coaxial cable, wireless link, etc.) on the other. Such nodes often are difficult to physically access, and may benefit from having a short range transceiver interface 122, as described above. The following discussion refers to an example embodiment for a fiber node, but is also applicable to other types of nodes.

In a fiber node example, such a node may be configured to communicate a status report to the server 104 or another computing device when a network interface 114 (or other type of transponder) is operating properly. The status report may contain information on one or more of a signal to noise ratio (SNRs) detected by connected devices (e.g., SNRs for cable modems and/or set top boxes connected to the fiber node), electrical current usage, temperature, downstream receive and transmit levels, upstream receive and transmit levels, and optical modulation index, or other information.

At some time, the network interface 114 may not be working properly. A technician may go to a geographic location of the fiber node and may attempt to communicate with the transceiver interface 122 using a mobile device 112 to obtain a status report. The status report may include some or all of the information listed above, as well as any detected errors. The mobile device 112 may also, using the interface 122, obtain a unique identifier of the fiber node and automatically collect information about devices (e.g., modems, set top boxes, etc.) connected to that particular fiber node. The mobile device 112 may then communicate some or all of the status report, including any of the other information collected from the fiber node, to the server 104 via the WAN2 108 for processing.

In response, the server 104 may communicate an instruction to the mobile device 112 instructing how to remedy the problem. For example, the mobile device 112 may instruct the fiber node to perform a hard reset and/or to execute a program script in an attempt to remedy the error. The instruction may also instruct the fiber node to attempt to communicate with the server 104 via the network interface 114 and/or the mobile device 112 via the short-range transceiver interface 122 after performing the instruction to determine whether the fiber node is able to successfully communicate with the server 104 and/or mobile device 112. If still unable to communicate with the server 104 (and not via the mobile device 112), the technician may have to take further action to remedy the error, such as physically accessing the fiber node.

Figure 2:
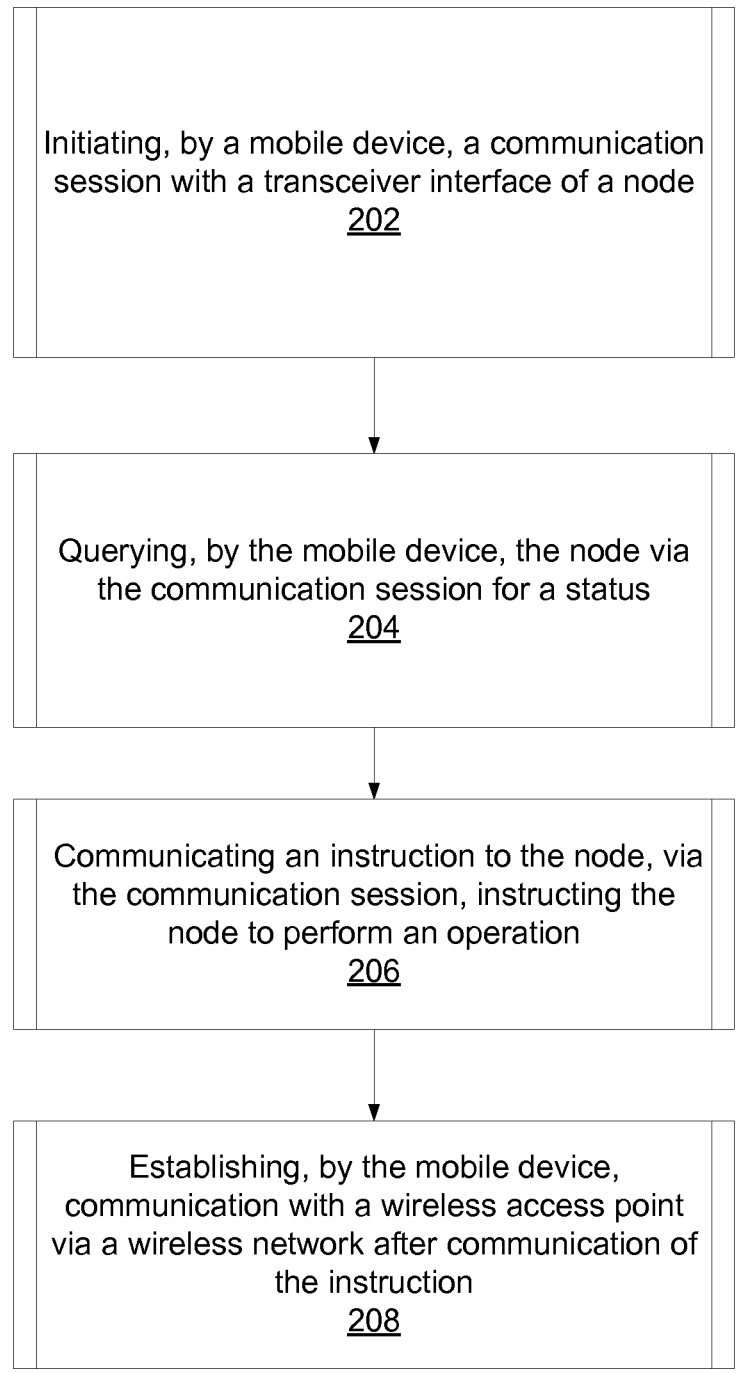
FIG. 2 is a flow diagram of an example method of a mobile device communicating with a node.

FIG. 2 is a flow diagram of an example method of a mobile device communicating with a node. The method may be implemented by the mobile device 112 or other devices (e.g., non-mobile devices) in the system 100. The blocks or steps therein shown in FIG. 2 may be arranged in other orders, additional operations may be included in the method, and/or one or more of the blocks or steps therein may be removed. Also, some or all of the operations associated with any of the blocks may be repeated one or more times. The method may begin at block 202. In block 202, the method may include initiating, by a mobile device, a communication session with a transceiver interface. The transceiver interface may be part of a node that comprises a network interface configured to communicate via a first wide area network and a wireless access point configured to establish a wireless network. In block 204, the method may include querying, by the mobile device, the node via the communication session for a status (e.g., a status report). The status report may be associated with an error preventing the node from communicating via the first wide area network or the wireless network. In block 206, the method may include communicating an instruction to the node, via the communication session, instructing the node to perform an operation. Example operations are to load and execute a program script, to conduct a hard reset, to limit access to a particular mobile device, etc. In block 208, the method may include establishing (or attempting to establish), by the mobile device, communication with a wireless access point via a wireless network after communication of the instruction. The method may then end or may return to any of the preceding blocks.

Figure 3:
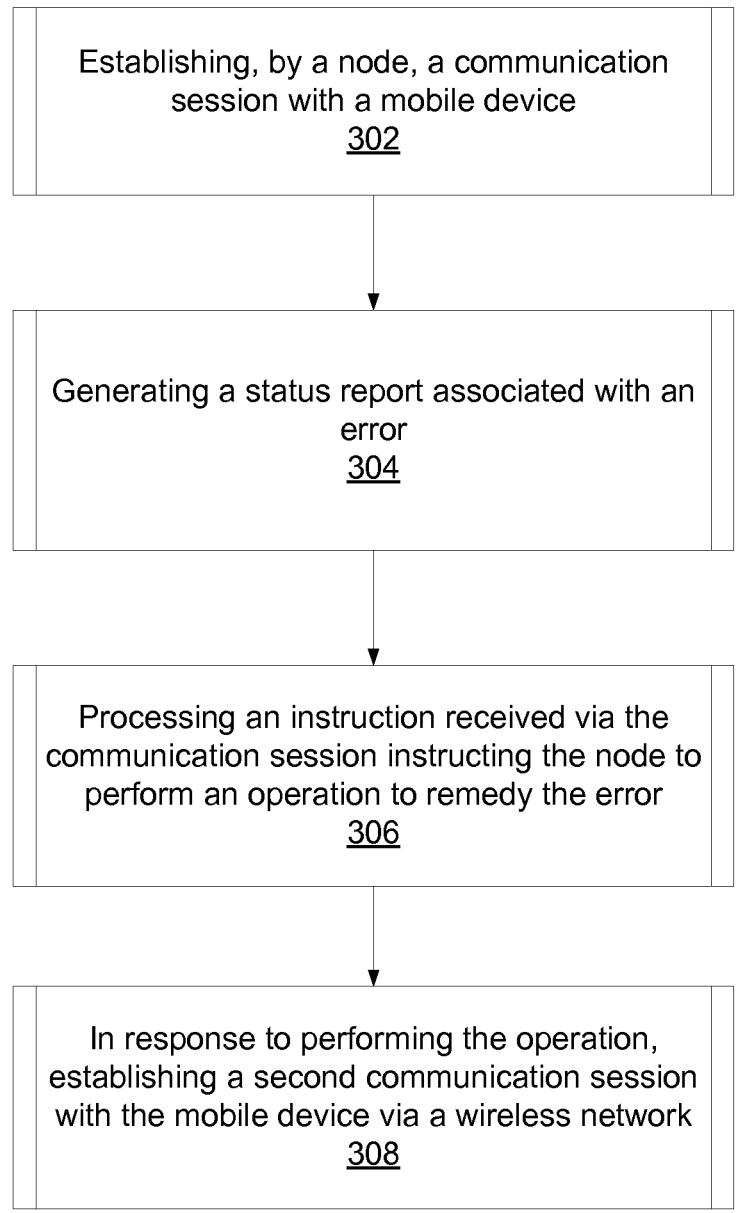
FIG. 3 is a flow diagram of an example method for a node to communicate with a mobile device.

FIG. 3 is a flow diagram of an example method of a node communicating with a mobile device. The method may be implemented by the node 102 or other devices in the system 100. The blocks or steps therein shown in FIG. 3 may be arranged in other orders, additional operations may be included in the method, and/or one or more of the blocks or steps therein may be removed. Also, some or all of the operations associated with any of the blocks may be repeated one or more times. The method may begin at block 302. In block 302, the method may include establishing, by a node (e.g., via a transceiver interface), a communication session with a mobile device. In block 304, the method may include generating a status (e.g., status report) associated with an error, for example, preventing the node from communicating via a first wide area network or a wireless network. In block 306, the method may include processing an instruction received via the communication session instructing the node to perform an operation to remedy the error. In block 308, the method may include, in response to performing the operation, establishing (or attempting to establish), by a wireless access point of the node, a second communication session with the mobile device via a wireless network. The method may then end or may return to any of the preceding blocks.

Any of the above-mentioned functional blocks, including the server 104, node 102, consumer mobile device 110, and mobile device 112, may each be implemented with at least one processor and at least one memory. The functional blocks may include hardware that may execute software and/or be configured in hardware to perform specific functions. The software may be stored on at least one computer-readable medium, which may be non-transitory, or on other memory in the form of computer-readable instructions. A computer may read those computer-readable instructions, and in response perform various steps as defined by those computer-readable instructions. Thus, any functions attributed to any of the functional blocks of FIG. 1 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 1 and may store computer-executable instructions and/or data used by any of those functional blocks. Alternatively or additionally, such a computer-readable medium storing the data and/or software may be physically separate from, yet accessible by, any of the functional blocks shown in FIG. 1.

Figure 4:
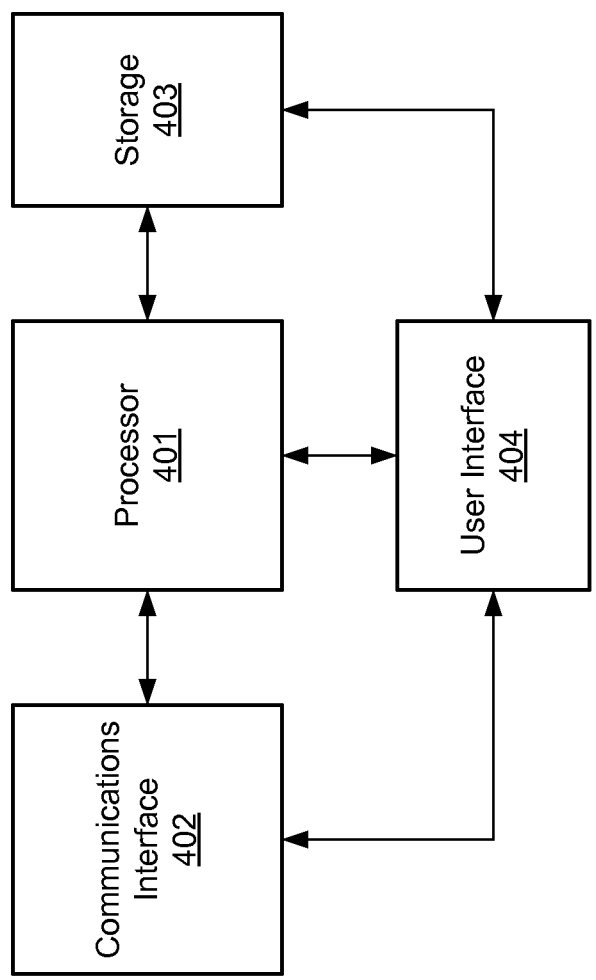
FIG. 4 is an example functional block diagram.

An example functional block diagram is shown in FIG. 4 and may include processor 401, a communications interface 402, storage 403, and a user interface 404. In this example, the computer-readable medium may be embodied by storage 403, and processor 401 may execute computer-executable instructions stored by storage 403. Communications interface 402 may provide for unidirectional or bidirectional communications with any network or device external to that computer. User interface 404 may allow for unidirectional or bidirectional information transfer with a human user using, for example, a display or a keyboard. Again, any of the functional blocks of FIG. 1 may be implemented using the components shown in FIG. 4.

One or more aspects of the above examples may be embodied in computer-executable instructions, such as in one or more program modules, executed by one or more computers or other devices such as by any of the blocks in FIG. 1. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, ROM, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A method comprising:
    querying a node for data comprising bandwidth usage statistics for a plurality of devices connected to a wireless network provided by a wireless access point of the node; and
    communicating, by a mobile device and to the node via a communication session established over a short-range communication interface of the node, an instruction configured to cause the node to adjust throughput for one or more of the plurality of devices, wherein the instruction is generated based on the data.

2. The method of claim 1, wherein the short-range communication interface comprises a Bluetooth communication interface, the method further comprising establishing, via the Bluetooth communication interface, the communication session.

3. The method of claim 2, wherein establishing the communication session comprises establishing a pico-net network comprising the node and the mobile device, the pico-net network being distinct from the wireless network.

4. The method of claim 1, further comprising initiating, based on a determination that the mobile device is authorized to access one or more control functions of the node, the communication session.

5. The method of claim 1, further comprising establishing, via the communication session, a master-slave relationship between the mobile device and the short-range communication interface.

6. The method of claim 1, wherein the data further comprises one or more radio frequency measurements of a signal received over a network interface of the node, and further comprising:
    communicating an instruction configured to cause the node to adjust an attenuation of the signal.

7. The method of claim 1, further comprising:
    receiving, by the mobile device and via the communication session, the data;
    communicating, by the mobile device and to a server, the data; and
    receiving, by the mobile device and from the server, the instruction.

8. The method of claim 7, further comprising receiving, by the mobile device and from the server, authentication information for establishing the communication session.

9. The method of claim 1, further comprising communicating, by the mobile device and to a server, the data, the data further comprising at least one of a serial number of the node or a geographic location of the node.

10. A method comprising:
    receiving, by a mobile device and from a server, authentication information authorizing access to one or more control functions of a node;
    establishing, by the mobile device, and with a short-range communication interface of the node, a communication session authenticated based on the authentication information; and
    communicating, by the mobile device, to the node, and via the communication session, an instruction configured to cause the node to perform an operation on itself to remedy an error to enable the node to communicate with the server via a network interface of the node, wherein the instruction is generated by the server based on data received by the mobile device, from the node, via the communication session.

11. The method of claim 10, wherein the short-range communication interface comprises a Bluetooth communication interface, and wherein establishing the communication session comprises establishing a pico-net network comprising the node and the mobile device.

12. The method of claim 10, wherein establishing the communication session comprises establishing a communication session independent of a wireless network provided by a wireless access point of the node.

13. The method of claim 10, wherein the data comprises one or more radio frequency measurements of a signal received over the network interface, and wherein communicating the instruction comprises communicating an instruction configured to cause the node to adjust an attenuation of the signal.

14. The method of claim 10, wherein the data comprises bandwidth usage statistics for a plurality of user devices connected to the node, and wherein communicating the instruction comprises communicating an instruction configured to cause the node to adjust throughput for one or more of the plurality of user devices.

15. A system comprising:
a mobile device comprising:
one or more processors; and
memory storing instructions that, when executed by the one or more processors of the mobile device, cause the mobile device to:
query a node for data comprising bandwidth usage statistics for a plurality of devices connected to a wireless network provided by a wireless access point of the node; and
communicate, to the node via a communication session established over a short-range communication interface of the node, an instruction configured to cause the node to adjust throughput for one or more of the plurality of devices, wherein the instruction is generated based on the data; and
the node comprising:
one or more processors; and
memory storing instructions that, when executed by the one or more processors of the node, cause the node to adjust throughput for one or more of the plurality of devices.

16. The system of claim 15, wherein the instructions, when executed by the one or more processors of the mobile device, further cause the mobile device to communicate, to the node via the communication session established over the short-range communication interface of the node, an instruction configured to cause the node to adjust an attenuation of a signal received over a network interface of the node.

17. A system comprising:
a mobile device comprising:
one or more first processors; and
first memory storing first instructions that, when executed by the one or more first processors, cause the mobile device to:
receive, from a server, authentication information authorizing access to one or more control functions of a node;
establish, with a short-range communication interface of the node, a communication session authenticated based on the authentication information; and
communicate, to the node and via the communication session, an instruction configured to cause the node to perform an operation on itself to remedy an error to enable the node to communicate with the server via a network interface of the node; and
the server comprising:
one or more second processors; and
second memory storing second instructions that, when executed by the one or more second processors, cause the server to generate, based on data received by the mobile device, from the node, and via the communication session, the instruction configured to cause the node to perform the operation on itself to remedy the error to enable the node to communicate with the server via the network interface of the node.

18. The system of claim 17, wherein the instruction configured to cause the node to perform the operation on itself to remedy the error to enable the node to communicate with the server via the network interface of the node causes the node to at least one of:
perform a hard reset; or
instruct a power supply of the node to remove power to the node and then resupply power to the node.

19. The system of claim 17, wherein the first instructions, when executed by the one or more first processors, further cause the mobile device to query the node for data comprising one or more radio frequency measurements of a signal received over the network interface, and wherein the second instructions, when executed by the one or more second processors, further cause the server to generate, based on the data, an instruction configured to cause the node to adjust an attenuation of the signal.

20. The system of claim 17, wherein the first instructions, when executed by the one or more first processors, further cause the mobile device to query the node for data comprising bandwidth usage statistics for a plurality of devices connected to a wireless network provided by a wireless access point of the node, and wherein the second instructions, when executed by the one or more second processors, further cause the server to generate an instruction configured to cause the node to adjust throughput for one or more of the plurality of devices.

* * * * *